United States Patent
Aselage et al.

(10) Patent No.: US 9,358,944 B1
(45) Date of Patent: Jun. 7, 2016

(54) ACTIVE BOLSTER WITH HOT-WELD RIVETS

(71) Applicant: FORD GLOBAL TECHNOLOGIES, LLC, Dearborn, MI (US)

(72) Inventors: Brandon M. Aselage, White Lake, MI (US); Sean B. West, Monroe, MI (US); Stacey H. Raines, Ypsilanti, MI (US); James H. Muiter, Plymouth, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 18 days.

(21) Appl. No.: 14/612,451

(22) Filed: Feb. 3, 2015

(51) Int. Cl.

| | |
|---|---|
| *B60R 21/231* | (2011.01) |
| *B29C 65/70* | (2006.01) |
| *B29C 65/02* | (2006.01) |
| *B60R 21/04* | (2006.01) |
| *B60R 13/02* | (2006.01) |
| *B60R 21/235* | (2006.01) |
| *B29L 22/02* | (2006.01) |

(52) U.S. Cl.
CPC ............ *B60R 21/231* (2013.01); *B29C 65/02* (2013.01); *B29C 65/70* (2013.01); *B60R 13/02* (2013.01); *B60R 21/04* (2013.01); *B60R 21/235* (2013.01); *B29L 2022/027* (2013.01); *B60R 2013/0287* (2013.01); *B60R 2021/0407* (2013.01); *B60R 2021/23557* (2013.01)

(58) Field of Classification Search
CPC .. B60R 21/231; B60R 13/02; B60R 21/2165; B29C 65/02
USPC ...................................................... 280/728.3
See application file for complete search history.

(56) References Cited

U.S. PATENT DOCUMENTS

| | | | | |
|---|---|---|---|---|
| 5,609,355 | A * | 3/1997 | Smydra | B60R 21/2171 280/728.3 |
| 6,213,497 | B1 * | 4/2001 | Spencer | B60R 21/045 280/730.1 |
| 6,848,715 | B2 * | 2/2005 | Nelson | B60R 21/206 280/730.1 |
| 6,976,706 | B2 | 12/2005 | Smith et al. | |
| 7,845,366 | B2 | 12/2010 | Brock et al. | |
| 7,959,183 | B2 * | 6/2011 | Perez Garcia | B60R 21/2165 280/728.3 |
| 8,071,002 | B2 | 12/2011 | Boyer | |
| 8,435,369 | B2 | 5/2013 | Manzke et al. | |

(Continued)

FOREIGN PATENT DOCUMENTS

WO    2014121920 A1    8/2014

*Primary Examiner* — Faye M Fleming
(74) *Attorney, Agent, or Firm* — Damian Porcari; MacMillan, Sobanski & Todd, LLC

(57) ABSTRACT

An active bolster for an automotive vehicle includes a plastic-molded outer trim panel with a welding track on an inside surface and a plastic-molded expandable bladder member with a welding flange along a peripheral edge with a first surface facing the trim panel inside surface and a second opposed surface. The welding track and the welding flange are joined by a hot weld to form a sealed chamber. A plurality of counterbores are distributed over the welding flange in order to form rivets that mechanically strengthen the weld. Each counterbore is comprised of a neck portion penetrating the first surface and a head portion penetrating the second surface. Each head portion includes an internal ledge extending laterally from the neck portion. The hot weld includes plastic-molded material that flows from the welding track through each neck portion and spreading onto the internal ledge in each head portion.

20 Claims, 6 Drawing Sheets

(56) References Cited

U.S. PATENT DOCUMENTS

| | | | |
|---|---|---|---|
| 8,454,054 B1 * | 6/2013 | Raines | B60R 21/239 280/730.1 |
| 8,474,861 B1 | 7/2013 | Twork | |
| 8,474,868 B2 | 7/2013 | Kalisz et al. | |
| 8,491,008 B2 | 7/2013 | Roychoudhury et al. | |
| 8,579,325 B2 * | 11/2013 | Roychoudhury | B60R 21/02 280/752 |
| 8,720,943 B1 | 5/2014 | Mazzocchi et al. | |
| 9,254,807 B1 * | 2/2016 | Aselage | B60R 21/04 |
| 2002/0053396 A1 * | 5/2002 | Murar | B29C 65/14 156/273.7 |
| 2009/0146402 A1 * | 6/2009 | Chen | B29C 44/1228 280/728.3 |

\* cited by examiner

ACTIVE BOLSTER WITH HOT-WELD RIVETS

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to active bolsters for occupant crash protection in automotive vehicles, and, more specifically, to increasing robustness of the bonding between an expandable bladder member and a trim wall which are separately molded and then hot welded together.

An active bolster is a vehicle occupant protection device with a gas-inflatable bladder to absorb impacts and reduce trauma to occupants during a crash. As opposed to deployable air bag cushions that emerge from behind various openings upon inflation, active bolsters use the interior trim surface itself to expand at the beginning of a crash event for absorbing the impact and dissipating energy through the action of an inflation gas. U.S. Pat. No. 8,205,909, issued Jun. 26, 2012, incorporated herein by reference, discloses an active knee bolster integrated into a glove box door that is light weight and visually attractive. U.S. Pat. No. 8,474,868, issued Jul. 2, 2013, also incorporated herein by reference, discloses a typical structure wherein an active bolster includes an outer wall or trim panel that faces a vehicle occupant attached to an inner wall or panel along a sealed periphery. One or both of the walls is deformable in order to provide an inflatable bladder. For example, the inner wall (i.e., bladder wall) may have a pleated (i.e., accordion-like) region that straightens out during inflation. The walls are initially spaced apart by a small amount when in their pre-deployment, non-inflated condition. This allows ingress of the inflation gas in a manner that can achieve an even inflation across the panel.

The inner and outer walls of a typical active bolster are comprised of molded thermoplastics such as polyethylene, polyolefin, or PVC. They are typically injection molded but could also be blow molded. When formed separately, the walls must be hermetically joined around their periphery in order to form the inflatable bladder. The joint must be strong to resist separation as a result of the high pressures during inflation.

A known method of sealing the bladder walls is by hot welding, which involves heating of the matching surfaces and then compressing them together. Examples include hot plate welding, IR welding, and laser welding. A generally planar welding flange has been provided around the outer perimeter of an inner (bladder) wall which is received by a generally planar surface of an outer (trim) wall. The outer wall and/or inner surfaces may also include upstanding welding ribs that increase the weld strength by penetrating and fusing with the welding flange or other opposing surface during the hot welding process in which the areas to be welded are heated and then compressed. Despite the penetration of these ribs, weld separation has continued to be a potential failure mode for active bolsters for various reasons including warping of the parts to be welded, temperature variations of the hot plates during welding, uncorrected variances in the pressure applied during welding, and characteristic differences between the trim wall and bladder wall which may be molded from different plastic formulations.

Various stresses during inflation also contribute to the possibility of weld failure. Due to the elasticity required for making the pleated bladder wall inflatable, a significant peel stress may be applied to the weld seam during expansion. Another source of stress is the shock wave caused by the explosive initiation of gas flow from the inflator. Twisting and uneven bulging of the overall bladder structure during inflation can create stress or concentrate existing stresses at certain weld locations (e.g., along long straight edges of the weld).

SUMMARY OF THE INVENTION

In the invention, the bonding strength between the outer trim wall and the inner bladder wall is increased over that which is obtained solely by fusion of materials produced by the hot weld through the use of structures and methods that simultaneously create integral rivets for mechanically clamping the weld seam together.

In one aspect of the invention, an active bolster is provided for an interior trim surface of an automotive vehicle. A plastic-molded outer trim panel has a welding track on an inside surface. A plastic-molded expandable bladder member has a central attachment section configured to attach to a support structure of the vehicle, a welding flange along a peripheral edge with a first surface facing the trim panel inside surface and a second opposed surface, and a pleated region between the central attachment section and the welding flange. The welding track and the welding flange are joined by a hot weld to form a sealed chamber. A plurality of counterbores are distributed over the welding flange, wherein each counterbore extends between the first and second surfaces. Each counterbore is comprised of a neck portion penetrating the first surface and a head portion penetrating the second surface. Each head portion includes an internal ledge extending laterally from the neck portion. The hot weld includes plastic-molded material that flows from the welding track through each neck portion and spreading onto the internal ledge in each head portion.

DETAILED DESCRIPTION OF PREFERRED EMBODIMENTS

Figure 1:
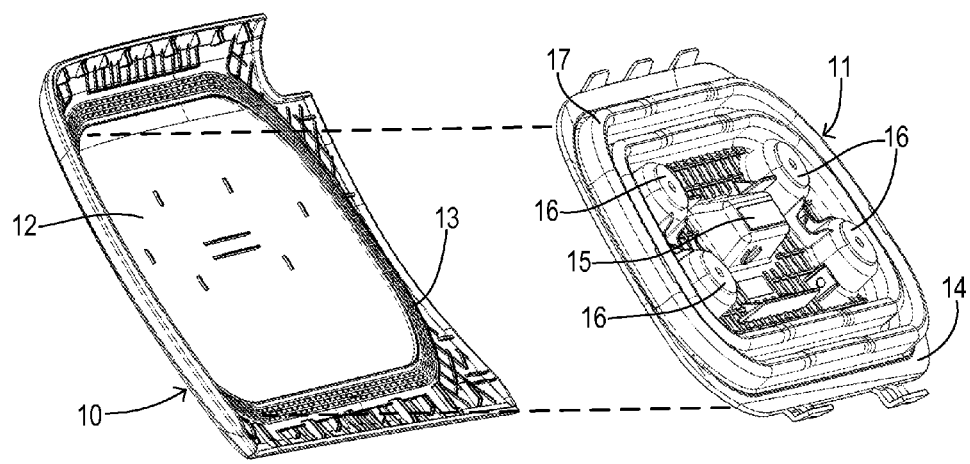
FIG. 1 is a perspective, exploded view of a prior art active bolster assembly including a trim panel front wall and back bladder wall.
Figure 2:
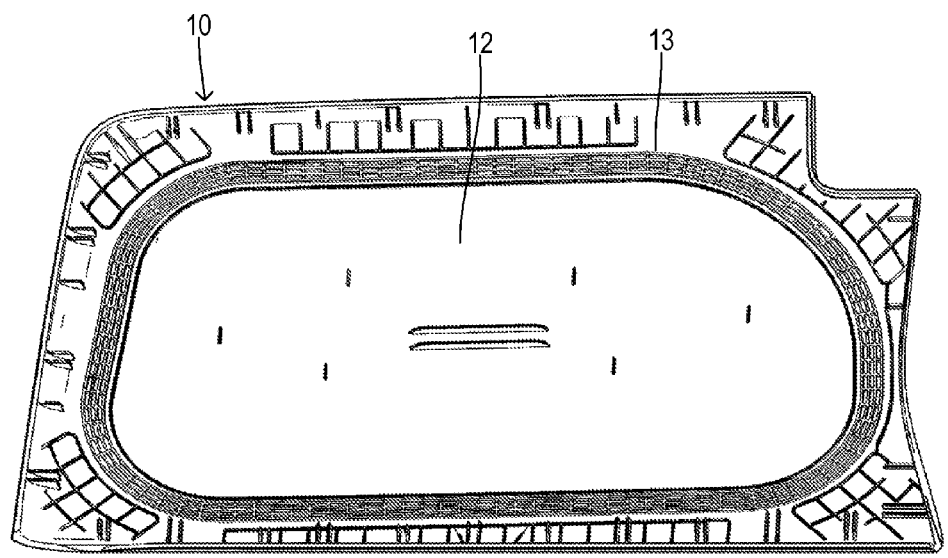
FIG. 2 is a rear perspective view of an inside surface of the trim panel front wall of FIG. 1.
Figure 3:
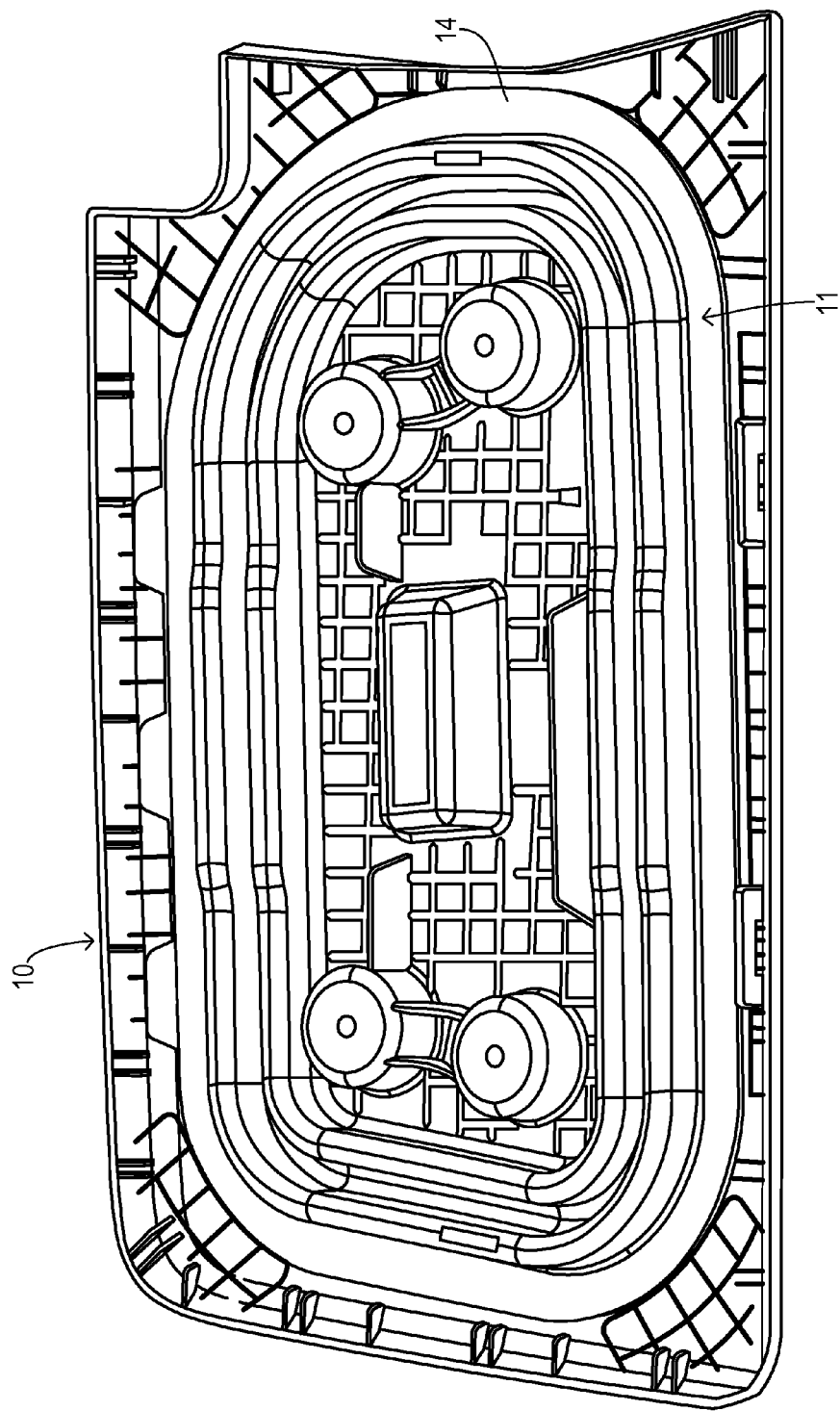
FIG. 3 is a rear perspective view showing a prior art bladder member assembled via hot welding to the trim panel of FIG. 2.

FIGS. 1-3 show a prior art active bolster formed as an interior trim panel which is part of a glove box door in an automotive vehicle. More specifically, a trim panel 10 functions as a front trim wall which receives an expandable bladder wall 11. Panel 10 has an inside surface 12 with a welding track or raceway 13 preferably formed as a rib that extends upward from the inside surface in order to bond with an outer flange 14 of bladder wall 11 (e.g., by plastic welding such as hot plate welding).

Bladder wall 11 has a recess 15 near the center for mounting an inflator (not shown) and a plurality of mounting towers 16 provided in a central attachment section for attaching the assembly to a reaction surface, such as an inner panel of the glove box door (not shown). A pleated region 17 is formed between towers 16 and outer flange 14 so that a series of pleats can unfold during inflation in a manner that allows trim panel 10 to displace toward the passenger cabin to cushion an impacting passenger.

Hot welding of track 13 and flange 14 creates a bladder cavity for receiving inflation gas from the inflator. During the hot welding operation, a hot plate, laser, or other heat source are used to melt plastic material of track 13 and flange 14, and after the heat source is removed then track 13 and flange 14 are pressed together and cooled so that the melted materials intermix and become welded together, resulting in an assembly shown in FIG. 3.

Figure 4:
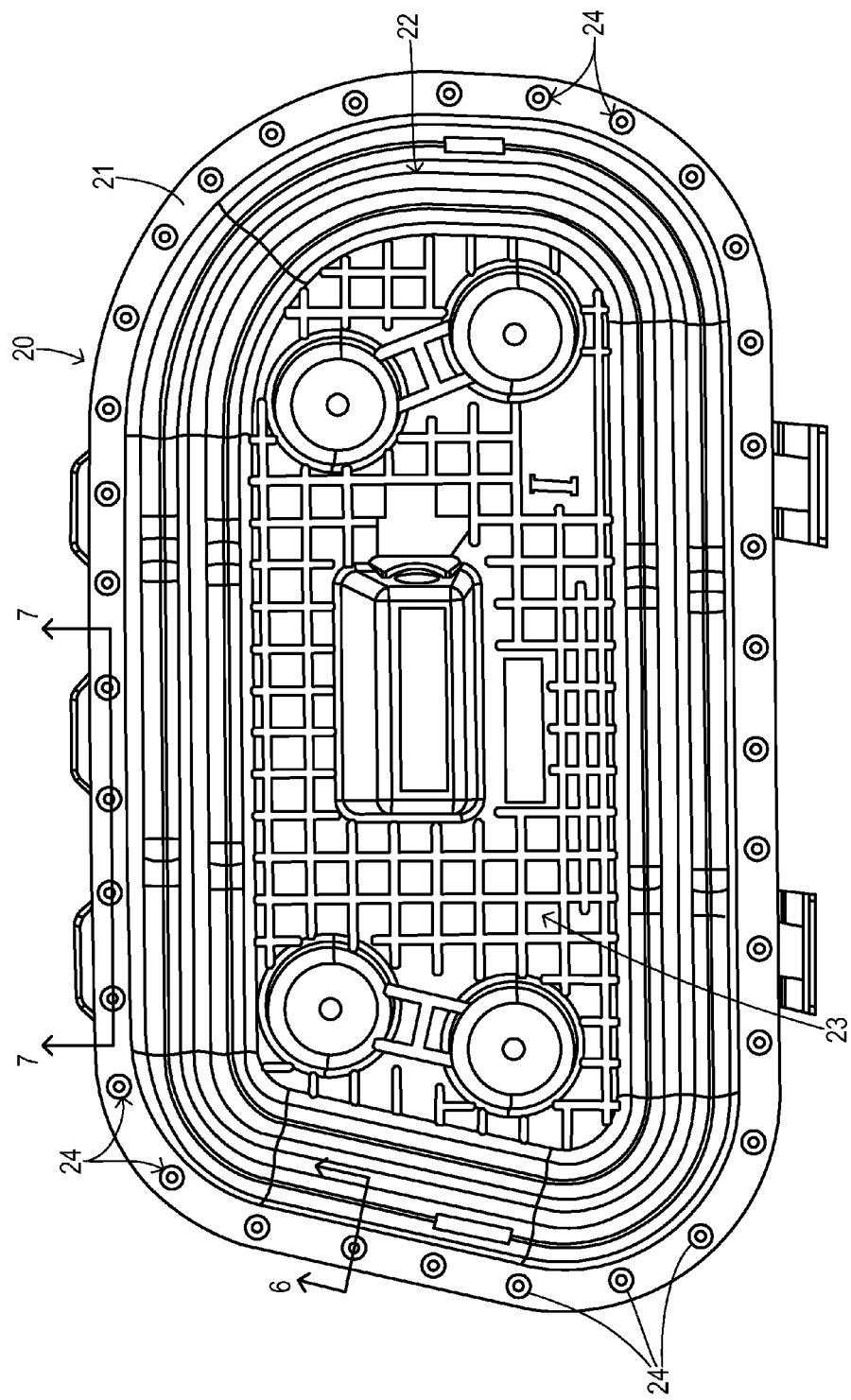
FIG. 4 is a plan view of a bladder member of the invention with a plurality of counterbores distributed over a weld flange prior to hot welding.

FIG. 4 shows a bladder member 20 of the present invention wherein a welding flange 21 forms a peripheral ring around bladder member 20. Bladder member 20 further includes a pleated region 22 between welding flange 21 and a central attachment section 23. In order to form a plurality of integral rivets, a plurality of counterbores 24 are distributed over welding flange 21 penetrating through opposed surfaces of welding flange 21. Preferably, counterbores 24 may be evenly spaced around the periphery such that the centers of counterbores 24 bisect the peripheral ring of welding flange 21.

Figure 6:
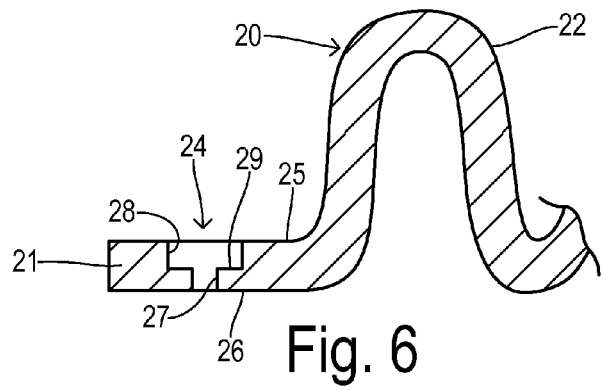
FIG. 6 is a cross-sectional view of the weld flange along line 6-6 of FIG. 4.
Figure 7:
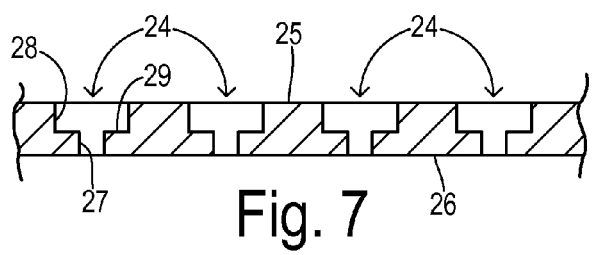
FIG. 7 is a cross-sectional view of the weld flange along line 7-7 of FIG. 4.

As shown in FIGS. 6 and 7, each counterbore extends between upper surface 25 and lower surface 26 to create an aperture through which plastic material flows from the welding track on the trim panel during hot welding as described below. Each counterbore 24 is comprised of a respective neck portion 27 and a head portion 28. Portions 27 and 28 are preferably coaxial and may have a cylindrical shape. Head portion 28 penetrates upper surface 25 and has a larger diameter than neck portion 27 to provide a internal ledge 29 extending radially outward from neck portion 27. In FIGS. 6 and 7, internal ledge 29 is substantially parallel with lower surface 26. Neck portion 27 penetrates lower surface 26 to provide a flow passage for melted plastic material originating from the trim panel during hot welding.

Figure 8:
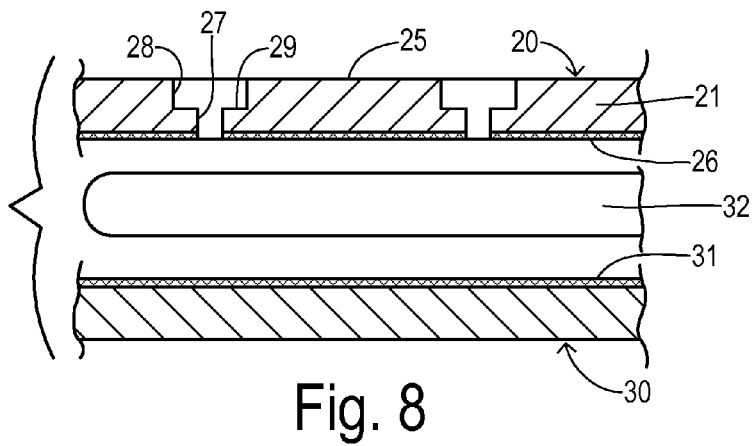
FIGS. 8-10 are cross-sectional views showing formation of the hot weld to produce integral rivets according to a method of the invention.
Figure 9:
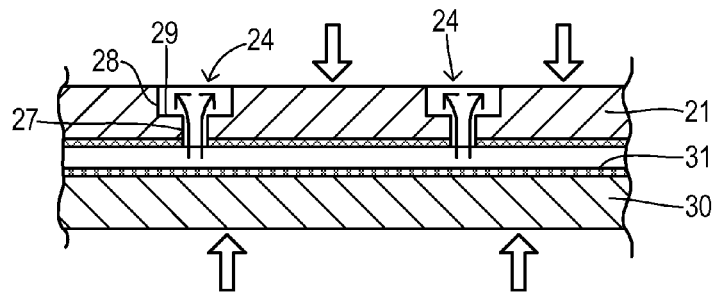

Thus, the purpose of counterbores 24 is to receive a flow of plastic material during hot holding from the weld track on the front trim panel, wherein the melted plastic material flows through each neck portion and spreads over the internal ledge in each head portion to form an integral rivet for adding mechanical strength to the weld seam. A method of the invention for hot welding an active bolster assembly preferably includes separately molding a plastic trim panel and a plastic bladder member using injection molding. As shown in FIG. 8, bladder number 20 with counterbores 24 is appropriately aligned with a trim panel 30 such that first surface 26 of welding flange 21 is aligned with a welding track 31 of trim panel 30. A radiant heat source 32 (such as a hot plate or a laser generator) is placed between surface 26 and welding track surface 31. Heat source 32 is activated in order to melt a layer of plastic material at surfaces 26 and 31. Then heat source 32 is withdrawn and welding flange 21 and trim panel 30 are compressed as shown in FIG. 9. As a result of compression, plastic material of the facing surfaces intermix to form a conventional hot weld. In addition, melted plastic material of welding track 31 near neck portions 27 of counterbores 24 flows through the respective neck portions 27 during compression in an amount sufficient to flow into head portions 28 and spread onto internal ledges 29. Finally, the trim panel and bladder member are cooled so that solidified material of the welding track forms rivets in the counterbores.

Figure 5:
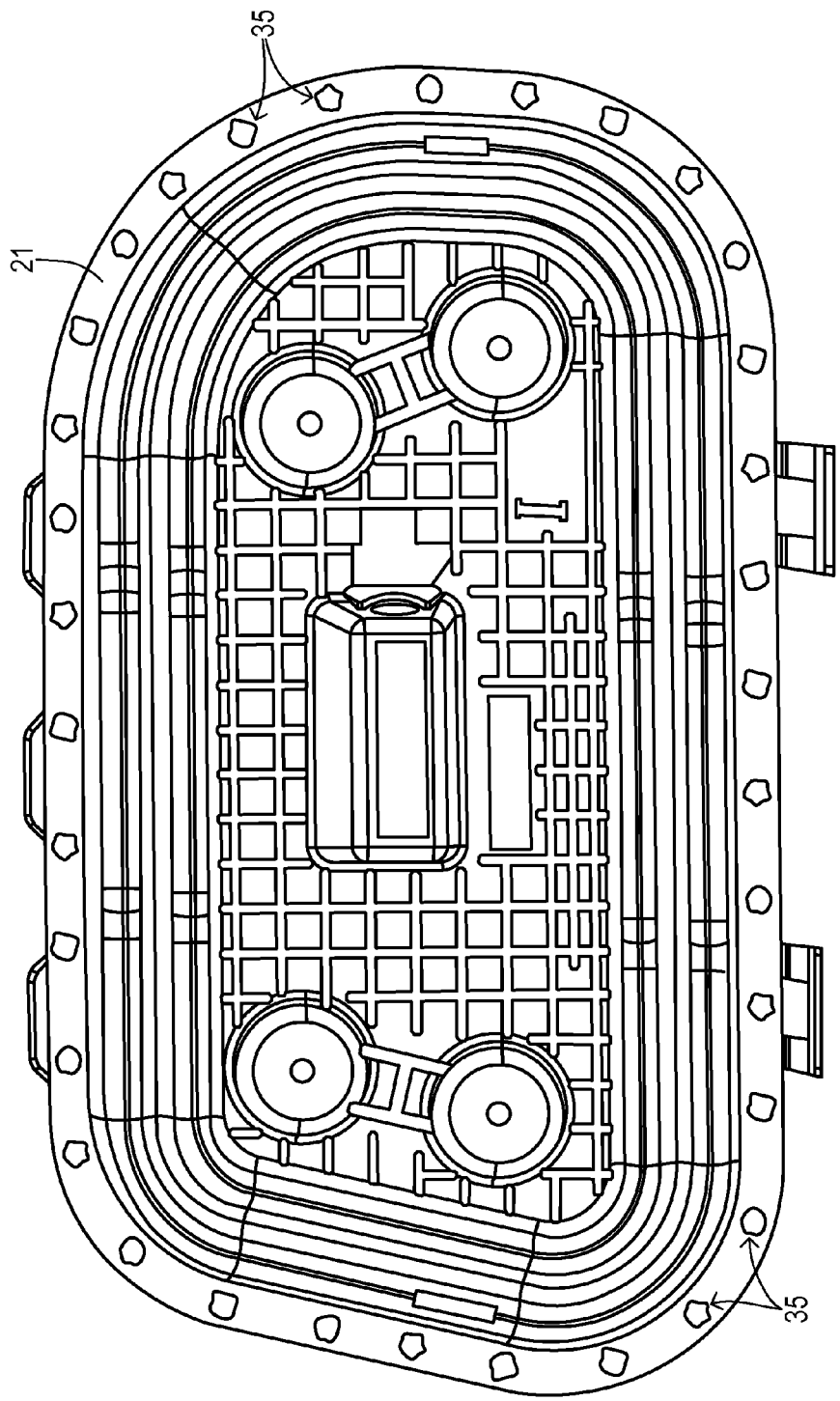
FIG. 5 is a plan view of the bladder member of FIG. 4 after hot welding.
Figure 10:
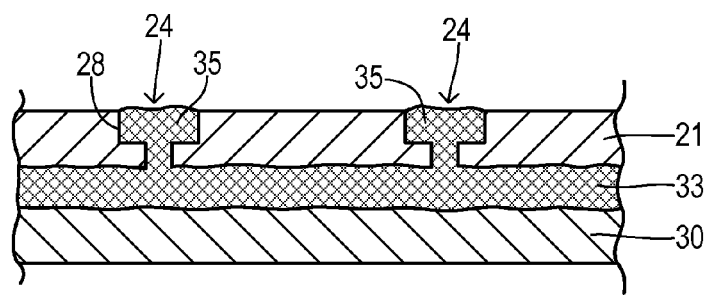

FIG. 10 is a cross-section showing a resulting hot weld bonded section 33 joining unmelted plastic material of welding flange 21 and trim panel 30. Hot-weld melted section 33 extends into each counterbore 24 to create integral rivets 35 which expand within the head portions 28 of counterbores 24 so that each rivet is mechanically retained by the respective internal ledge 29 and narrower the plastic material around each neck portion 27. FIG. 5 shows the resulting integral rivets 35 distributed over the periphery of welding flange 21. Rivets 35 may be formed over the entire periphery as shown in FIG. 5 or may be utilized only in regions needing additional reinforcement to withstand the inflation forces. Since counterbores 24 can be formed during initial injection molding of the bladder member, an increased joint strength can be obtained without added parts or added processing.

Figure 11A:
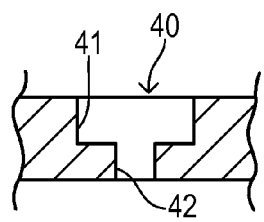
FIGS. 11A and 11B are cross-sectional and top views, respectively, of a counterbore with cylindrical neck and head portions.
Figure 11B:
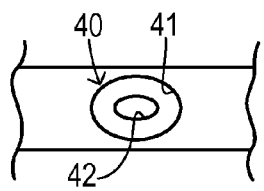
Figure 12:
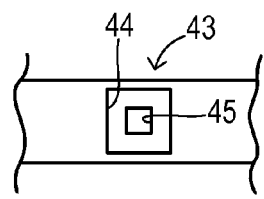
FIG. 12 is a top view of an alternative shape for a counterbore.

Counterbores 24 may be formed according to a variety of alternate profiles besides the preferred cylindrical (disk-like) shapes shown in FIGS. 4-10. For example, a counterbore 40 in FIGS. 11A and 11B may have a head portion 41 and neck portion 42 with elliptical profiles. FIG. 12 is a top view showing a counterbore 43 with a head portion 44 and neck portion 45 shaped as rectangular cuboids (box-like). A side cross-section of counterbore 43 would appear identical to the cross-section shown in FIG. 11A. In each case, the head portions have a larger profile than the neck portions in order to provide the internal ledge to receive spreading plastic material from the neck portion.

Figure 13A:
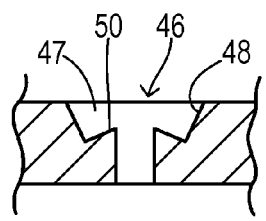
FIGS. 13A and 13B are cross-sectional and top views, respectively, of a counterbore with a sloped ledge.
Figure 13B:
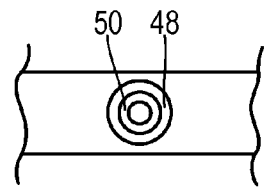

FIGS. 13A and 13B show an alternative embodiment wherein a head portion is formed with a quasi-cylindrical profile. More specifically, a counterbore 46 is comprised of a head portion 47 with a slanted outer edge 48 and an internal ledge 50 that is slanted with respect to the lower surface of the welding flange. The slanted surfaces may provide for greater interlocking of the head of a rivet that is formed within counterbore 46.

What is claimed is:
1. An active bolster for providing an interior trim surface of an automotive vehicle, comprising:
 a plastic-molded outer trim panel having a welding track on an inside surface; and
 a plastic-molded expandable bladder member having a central attachment section configured to attach to a support structure of the vehicle, a welding flange along a peripheral edge with a first surface facing the trim panel inside surface and a second opposed surface, and a pleated region between the central attachment section and the welding flange, wherein the welding track and the welding flange are joined by a hot weld to form a sealed chamber;

wherein a plurality of counterbores are distributed over the welding flange, wherein each counterbore extends between the first and second surfaces, wherein each counterbore is comprised of a neck portion penetrating the first surface and a head portion penetrating the second surface, and wherein each head portion includes an internal ledge extending laterally from the neck portion;

wherein the hot weld includes plastic-molded material that flows from the welding track through each neck portion and spreading onto the internal ledge in each head portion.

2. The active bolster of claim 1 wherein the welding track and welding flange define a peripheral ring, and wherein the counterbores are spaced around a periphery bisecting the peripheral ring.

3. The active bolster of claim 1 wherein the neck and head portions define respective cylinders.

4. The active bolster of claim 3 wherein respective neck and head portions are coaxial.

5. The active bolster of claim 1 wherein the internal ledges are parallel to the first surface.

6. The active bolster of claim 1 wherein the internal ledges are slanted with respect to the first surface.

7. An active bolster comprising:
a trim panel having a peripheral welding track; and
a pleated bladder member attachable to a vehicle and including a peripheral flange hot welded with the welding track;
wherein counterbores are distributed over the welding flange comprising respective neck and head portions, wherein the hot weld includes plastic material that flows from the welding track through each neck portion and spreading over an internal ledge in each head portion.

8. The active bolster of claim 7 wherein the welding track and welding flange define a peripheral ring, and wherein the counterbores are spaced around a periphery bisecting the peripheral ring.

9. The active bolster of claim 7 wherein the neck and head portions define respective cylinders.

10. The active bolster of claim 9 wherein respective neck and head portions are coaxial.

11. The active bolster of claim 7 wherein the internal ledges are parallel to the first surface.

12. The active bolster of claim 7 wherein the internal ledges are slanted with respect to the first surface.

13. A method of manufacturing an inflatable bladder for an active bolster, comprising the steps of:

molding a plastic trim panel having a welding track on an inside surface;

molding a plastic bladder member having a central attachment section configured to attach to a reaction surface, a welding flange along a peripheral edge with a first surface facing the trim panel inside surface and a second opposed surface, and a pleated region between the central attachment section and the welding flange, wherein counterbores are molded in the welding flange comprising respective neck and head portions;

heating the weld flange and the welding track to melt plastic material at the first surface and an outer surface of the welding track;

compressing the weld flange against the welding track sufficient to flow melted plastic material of the welding track through the neck portions into the head portions; and cooling the trim panel and bladder member so that solidified material of the welding track forms rivets in the counterbores.

14. The method of claim 13 wherein the heating step is comprised of:
aligning the weld flange and the welding track;
locating a radiant heat source between the weld flange and the welding track;
activating the radiant heat source; and
withdrawing the radiant heat source.

15. The method of claim 14 wherein the radiant heat source is a hot plate.

16. The method of claim 13 wherein the welding track and welding flange define a peripheral ring, and wherein the counterbores are spaced around a periphery bisecting the peripheral ring.

17. The method of claim 13 wherein the neck and head portions define respective cylinders.

18. The method of claim 17 wherein respective neck and head portions are coaxial.

19. The method of claim 13 wherein each head portion includes an internal ledge extending laterally from the neck portion, and wherein the internal ledges are parallel to the first surface.

20. The method of claim 13 wherein each head portion includes an internal ledge extending laterally from the neck portion, and wherein the internal ledges are slanted with respect to the first surface.

* * * * *